UNITED STATES PATENT OFFICE.

WALTER B. ALLEN, OF WORCESTER, MASSACHUSETTS, ASSIGNOR TO ALLEN, HALL & CO., OF READING, MASSACHUSETTS, A COPARTNERSHIP.

INTERIOR WALL-COATING.

No. 930,264.  Specification of Letters Patent.  Patented Aug. 3, 1909.

Application filed November 6, 1907. Serial No. 400,928.

*To all whom it may concern:*

Be it known that I, WALTER B. ALLEN, a citizen of the United States, residing at Worcester, in the county of Worcester and State of Massachusetts, have invented new and useful Improvements in Interior Wall-Coatings, of which the following is a specification.

My invention relates to improvements in interior wall coatings and the object of my invention is to cheapen the cost of such compositions and facilitate the application of the same.

My composition consists of the following ingredients preferably combined in the proportions stated, viz:—whiting or other chalky material 85 pounds, varnish 3½ gallons, sand 1 bushel. These ingredients are to be thoroughly mixed by agitation. Any varnish in ordinary use may be employed, but in those cases where the varnish is somewhat dense and viscous, I find it necessary to temper and thin the same by adding paint oil and turpentine until the resulting compound is of the proper consistency. With the cheap rosin varnish which is commonly sold in large quantities to the trade, I find that I am able to obtain the best results by adding to the above ingredients about one gallon each of paint oil and turpentine.

My composition is applied by means of a trowel or float to the walls or ceiling of a room in the same manner as the "skim coat" of sand finish is put on a plaster wall after the first layer of mortar known as the "scratch coat" is laid upon the lathing. As ordinarily applied my compound forms a coating about one-sixteenth of an inch in thickness, which is sufficient to cover all cracks, scratches, depressions and other imperfections in walls and ceilings. Not only may my composition be laid upon plaster or mortar surfaces, but also upon almost any surface including wood, metal, brick, stone and concrete. In this respect my invention differs from the finishing coat usually employed, whose use is restricted to covering a layer of mortar or plaster.

If desired, coloring matter may be mixed directly with my compound before the same is used upon the wall, or the composition may be first laid upon the surface and then painted in the usual manner. In the former case, I have found that I am able to obtain better results with oil color than with water color, though either can be used with good effect.

I am aware that coloring matter has heretofore been introduced into ordinary plaster or mortar, but the results have been far from satisfactory owing to the fact that the lime in the mortar often attacks the chemical composition of the color and causes it to disintegrate. Even in such case mineral or water colors alone can be used, it being impossible to mix in oil color of any kind.

I prefer to mix the several ingredients of my composition in the following manner:— I first place a considerable quantity of some chalky substance preferably whiting free from lumps, in the bottom of a large receptacle, and then stir in the varnish until there is formed a homogeneous liquid mass. Should the varnish be too thick, so that it is impossible to effect a perfect mixture, I am then obliged to pour in a sufficient quantity of turpentine or the like to thin the same, and enough paint oil to temper the drying qualities of the varnish. The final step is now accomplished by adding beach sand until the entire mixture is of the consistency of common mortar or plaster, and the composition is ready for use.

What I claim and desire to secure by Letters Patent is:—

The herein described composition of matter consisting of whiting eighty-five pounds, varnish three and one-half gallons, paint oil one gallon, turpentine one gallon, and sand one bushel.

In testimony whereof I have hereunto set my hand in presence of two subscribing witnesses, this eighteenth day of October 1907.

WALTER B. ALLEN.

Witnesses:
CHAS. F. PERKINS,
K. M. SULLIVAN.